United States Patent [19]

Opderbeck et al.

[11] 3,725,107
[45] Apr. 3, 1973

[54] COPYING SHEET

[75] Inventors: Fritz Opderbeck, Buederich Near Dusseldorf; Theodor Ploetz, Hoesel, Kries Nettmann; Herbert Wistuba, Viersen, all of Germany

[73] Assignee: Feldmuhle Anlagen-Und Produktionsgesellschaft mit beschrankter Haftung, Duesseldorf-Oberkassel, Germany

[22] Filed: June 14, 1971

[21] Appl. No.: 153,025

Related U.S. Application Data

[63] Continuation of Ser. No. 809,949, March 24, 1969, abandoned.

[30] Foreign Application Priority Data

Mar. 23, 1968 Germany...................P 17 71 031.5

[52] U.S. Cl. .........117/36.7, 117/155 VA, 260/27 R, 260/41 C

[51] Int. Cl..........................B41m 5/16, B41m 5/18

[56] References Cited

UNITED STATES PATENTS

| | | | |
|---|---|---|---|
| 3,167,443 | 1/1965 | McHugh | 117/36.7 |
| 3,240,932 | 3/1966 | Haines | 117/36.7 |
| 3,247,006 | 4/1966 | Hoge et al. | 117/36.7 |

*Primary Examiner*—Murray Katz
*Attorney*—Kelman & Berman

[57] ABSTRACT

The invention relates to a copying sheet consisting of a base material or substrate having pressure or heat sensitive, opaque coatings of synthetic dispersions and softeners, preferably in combination with at least one stearate, wherein either the base material or the coating contains dyes or colored pigments that, on application of heat and/or pressure, make the characters impressed on the sheet readable.

5 Claims, No Drawings

COPYING SHEET

This application is a continuation of Ser. No. 809,949, filed Mar. 24, 1969 now abandoned.

Copying materials of the above-described type are progressively replacing the heretofore customary means of producing copies, e.g., carbon papers. These new copying materials have gained particular significance as a consequence of the expanding use of office machines, computers, and other devices that require up to 15 and more readable copies.

All kinds of suggestions have been made regarding such copying sheets. A large group of these sheets is based on the following principle: a coating that consists of a large number of minute synthetic particles and that is opaque due to light refraction at the grain boundaries of the individual particles or due to the included pores is deposited on a dark-colored base material, thereby covering the dark-colored background. Wax mixtures were originally used for this coating. Now, coatings of synthetic solutions or dispersions are common, because they provide better opacities and their mechanical and thermal properties are desirable. However, the production of the opaque coating depends on very specific process conditions and on the medium from which the synthetic solutions or dispersions are deposited on the colored base material.

In one process, for instance, the synthetic material is dissolved in a solvent and another organic liquid is added which mixes with the solvent but is not a, or only a poor, solvent for the synthetic. When the deposited synthetic solution or dispersion is carefully dried, the solvent evaporate first, then the synthetic flocculates or separates out and forms the opaque coating required for covering the dark-colored background. On the other hand, in place of this system, solvent-non-solvent, oil-in-water, and water-in-oil emulsions of the synthetics have proven particularly satisfactory. Among these are, for instance, a solution of the synthetic in methylenechloride, to which a small percentage of water is added.

The effectiveness of such copying papers is based on the opaque coating becoming transparent at the point where pressure and/or heat is applied, for instance, by a pencil or the typewriter character, so that the dark coloring of the substrate below it becomes visible. Or, instead of darkening the base material by using, for instance, carbon black or a green, blue or purple dye, one can add small percentages of dyes or pigments to the synthetic producing the opacity; these do not essentially affect the white color of the opaque coating, while producing a visible image when hit, for instance, by a typewriter character.

As already mentioned, the technical requirements demanded of such copying sheets are very high. The required number of 15 and more readable copies can be supplied only if the opaque coating is highly sensitive. On the other hand, this coating should not be so sensitive as to melt when exposed to slight mechanical stress or low heat, e.g., when exposed to the sun or when stored in a tropical climate. Clearly, such requirements are really mutually exclusive, because a coating material so sensitive that the 15th copy is still clearly readable implies a relatively low softening point.

Many attempts have been made to break this causal relationship between sensitivity and insufficient heat resistance, but without success to date. It has been attempted to overcome this difficulty by adding enough softener to the synthetic solutions or dispersions (among which the mixed polymer of vinylchloride/vinylacetate, with predominant percentage of vinylchloride, has proven successful) to obtain just the required number of copies without producing a heat sensitivity in the coated sheet to the degree that it became totally black during extended storage at slightly elevated temperature. This compromise is not a satisfactory solution.

Since excessive heat sensitivity is thus far one of the principal reasons barring general acceptance of the above described copying sheets and their use in any climate, there is a great need for a copying sheet with a coating that has a much higher softening point than the sheets with opaque synthetic coatings known to date and that still has the same sensitivity to impact pressures or heat.

It has now been found, surprisingly, that the technical problem herein discussed can be solved by abandoning the previous attempts to find new and more suitable synthetic solutions or dispersions mixed with softeners and following an entirely new course. The copying sheet of the present invention consists of a base material such as paper with a pressure and/or heat sensitive opaque coatings of synthetic solutions or dispersions and softeners, preferably in combination with at least one stearate, wherein either the base material or the coating contains dyes or colored pigments which make the characters impressed on the coating readable when heat and/or pressure are applied and wherein the coating contains about 5 to 50 percent by weight of a modified rosin ester. The preferred range is about 10 to 30 percent by weight.

More particularly, the coating compositions of the present invention contain (without reference to solvents or water) about 30 to 70 percent, and preferably 40 to 50 percent, by weight of mixed polymers or synthetics; about 5 to 50 percent, and preferably 10 to 30 percent, by weight of the rosin component; about 10 to 35 percent, and preferably about 20 percent, by weight of softener; and, about 5 to 30 percent, and preferably 10 to 20 percent, by weight of stearate (e.g., aluminum stearate).

The softening point of such coatings can be raised by about 20° C by including the rosin ester of the present invention in the coating material, i.e., from the current softening point of about 60° C to 80° C and higher. And the addition of such modified rosin ester has the particular advantage of permitting a reduction of the coating softener percentage, which, currently, is up to 45 percent by weight, by one-half. Since these softeners are relatively expensive to produce, this reduction represents considerable economic and technological progress. The percentage of softener in a coating in accordance with the present invention and consisting of synthetics, rosin ester, softener and at least one stearate is only 10 to 35 percent by weight, preferably around 20 percent by weight.

The stearates used together with softeners in such coating materials for copying sheets assist in the emulsification (particularly with water-in-oil emulsions), and improve the flow characteristics, of the synthetics. Normally, a stearate of a bivalent metal, particularly calcium stearate, is used. For the copying sheet of the present invention, containing a considerable percentage of rosin ester, aluminum stearate has proven more suitable and it is used in an amount between about 5 and 30 percent by weight of the entire coating. Most suitable are those coatings with about 10 to 20 percent by weight of aluminum stearate.

The raising of the softening point of the coating by 20° C and more, while retaining the same copying sensitivity, affords, in the copying sheets of the present invention, the opportunity of using a high percentage of stearates. This has, in turn, the advantage of greatly broadening the coating melting temperature range. Currently available coatings with about 4 to 8 percent stearate have a melting range of about 58° C to 60° C, while those of the present invention with a preferred content of about 10 to 20 percent by weight of aluminum stearate have a melting range of 75° to 87° C. The raising of the softening point by 17° C was, thus, accompanied by a broadening of the melting range from about 20° to 12° C. The advantage of such a broad melting range is that the copying sheets of the present invention do not, like the currently available ones, become completely black because the specified storage temperature is slightly or temporarily exceeded.

The modified rosin esters used in accordance with the invention are derivatives of natural rosins, particularly those from coniferous woods, the essential constituent of which is abietic acid, and particularly after processing with acrylic acid, maleic acid and esters of these acids. They are additionally esterified with polyhydric alcohols like glycerol, trimethylolproponol or pentacrythritol and are sold, for instance, under the trade names Laropal and Alresat.

Typical examples of copying sheets made according to the present invention are produced as follows:

EXAMPLE 1

A wood-free 40 gram paper is dyed black in a printing press. On this dark-dyed base material is deposited a coating compound made as follows:

A mixture consisting of
  50.0 parts by weight vinylchloride-vinylacetate mixed polymer with 15 percent of vinylacetate content
  15.0 parts by weight "Alresat 967C" (rosin modified with acrylic acid)
  6.2 parts by weight castor oil
  7.4 parts by weight trioctylphosphate
  7.4 parts by weight diisotridecylphthalate
  14.0 parts by weight aluminum stearate
is dissolved in 700 parts by weight of methylene chloride. To this solution are added 200 parts by weight of water and the mixture emulsified. This emulsion is deposited on the base paper by means of a roller coating fixture and this is done in such quantity that the completed copying sheet has, after careful drying at 55° C, a coating of 8 to 10 gram/m².

In the examples 2 to 4 the same method of operation is used as described in Example 1, while the composition of the coating compound is changed:

EXAMPLE 2

A mixture of
  50.0 parts by weight vinylchloride-vinylacetate mixed polymer with 20 percent vinylacetate content
  30.0 parts by weight "Alresat 967C" (rosin modified with acrylic acid)
  2.8 parts by weight castor oil
  3.6 parts by weight trioctylphosphate
  3.6 parts by weight diisotridecylphthalate
  10.0 parts by weight aluminum stearate
is dissolved in 900 parts by weight of methylene chloride. To this solution are added 270 parts by weight of water and the mixture emulsified.

EXAMPLE 3

A mixture of
  40.0 parts by weight "Vinoflex 452" (vinylchloride-maleic acid ester mixed polymer with 20 percent maleic acid ester content)
  10.0 parts by weight "Albertol 111L" (modified phenol resin)
  8.6 parts by weight castor oil
  10.7 parts by weight trioctylphosphate
  10.7 parts by weight diisotridecylphthalate
  20.0 parts by weight aluminum stearate
is dissolved in 900 parts by weight of methylene chloride. To this solution are added 270 parts by weight of water and the mixture emulsified.

EXAMPLE 4

A mixture of
  40.0 parts by weight "Vinylite VAGH" (mixed polymer of vinylchloride, vinyl acetate and other components)
  20.0 parts by weight "Alresat 945C" (rosin adduct)
  5.6 parts by weight castor oil
  7.2 parts by weight trioctylphosphate
  7.2 parts by weight diisotridecylphthalate
  20.0 parts by weight aluminum stearate
is dissolved in 1,000 parts by weight of methylene chloride. To this solution are added 450 parts by weight of water and the mixture emulsified.

What is claimed is:

1. In a copy sheet consisting of a paper base material, a normally opaque coating on said base material, and coloring matter interposed between said coating and said base material, the color of said coating being different from the color of said coloring matter, the opaque coating obscuring said coloring matter, said coating responding to applied pressure by becoming sufficiently transparent to reveal said coloring matter, the improvement in the composition of said coating which essentially consists of:
  1. 30 to 70 percent by weight of a copolymer of vinyl chloride and vinyl acetate;
  2. 10 to 35 percent by weight of a plasticizer for said copolymer;
  3. 5 to 30 percent by weight of a stearate of calcium or of aluminum; and
  4. 5 to 50 percent by weight of a modified rosin ester,
  5. the amount of said modified rosin ester being sufficient substantially to raise the temperature at which said coating becomes transparent in the absence of applied pressure.

2. In a sheet as set forth in claim 1, the amount of said rosin ester being between 10 percent and 35 percent by weight.

3. In a sheet as set forth in claim 1, said stearate being aluminum stearate.

4. In a sheet as set forth in claim 3, the amount of said aluminum stearate being about 10 to 20 percent by weight.

5. In a sheet as set forth in claim 4, the amount of said copolymer being between about 40 percent and 50 percent, the amount of said plasticizer being about 20 percent, and the amount of said modified rosin ester being between about 10 percent and 30 percent.

* * * * *